United States Patent [19]

Morozumi et al.

[11] 4,143,110

[45] Mar. 6, 1979

[54] METHOD OF AGGLOMERATING POLYTETRAFLUOROETHYLENE POWDER

[75] Inventors: Mituharu Morozumi, Yokohama; Masataka Arai, Kanagawa; Shigeru Iseki, Tokyo, all of Japan

[73] Assignee: Asahi Glass Company Ltd., Tokyo, Japan

[21] Appl. No.: 813,867

[22] Filed: Jul. 8, 1977

[51] Int. Cl.$^2$ ............................................. B01J 2/14
[52] U.S. Cl. ................................. 264/117; 264/122; 264/127
[58] Field of Search ..................... 264/117, 122, 127

[56] References Cited

U.S. PATENT DOCUMENTS

| | | | |
|---|---|---|---|
| 3,265,679 | 8/1966 | Black et al. | 264/117 |
| 3,882,217 | 5/1975 | Banham et al. | 264/117 |

Primary Examiner—Robert F. White
Assistant Examiner—James R. Hall
Attorney, Agent, or Firm—Oblon, Fisher, Spivak, McClelland & Maier

[57] ABSTRACT

Finely ground polytetrafluoroethylene molding powder with or without a filler is subjected to high speed agitation in the presence of a medium consisting essentially of water and a hydrophobic organic liquid at a ratio of 0.5 to 1 liter per 1 Kg of the resin to agglomerate it. Hydrophobic organic liquids mean organic liquid which dissolve less than 15 wt. % in water at the temperature of agglomeration.

The volumetric ratio of the organic liquid to water is in a range of 2 to ½.

The agglomerated product having narrow particle size distribution and high bulk density and free flowing property can be obtained by the agitation for short time.

16 Claims, No Drawings

METHOD OF AGGLOMERATING POLYTETRAFLUOROETHYLENE POWDER

BACKGROUND OF THE INVENTION

1. Field of the Invention

The present invention relates to a method of agglomerating finely ground polytetrafluoroethylene molding powder with or without a filler. More particularly, it relates to a novel method of agglomerating finely ground polytetrafluoroethylene molding powder having an average particle size of less than 100$\mu$ by subjecting it to high speed agitation in a medium comprising water and a hydrophobic organic liquid whereby excess agglomeration is controlled to obtain polytetrafluoroethylene agglomerated powder having narrow a particle size distribution for a short time.

2. Description of the Prior Art

It has been proposed to agglomerate finely ground powder in order to improve the processability of granular molding powder of polytetrafluoroethylene (hereinafter referred to as PTFE).

Agglomerated PTFE has excellent powder flowability and bulk density and when molded imparts excellent characteristics to the molded product. Moreover, agglomerated PTFE is advantageously used in automatic molding processes.

Various processes for agglomerating PTFE powder have been proposed, such as for example the agglomeration of PTFE by agitation in a slurry in water (U.S. Pat. No. 3,766,133 and U.S. Pat. No. 3,366,615), and the agglomeration of PTFE by wetting with an organic liquid (U.S. Pat. No. 3,265,679 and B.P. 1,100,388). Still another technique is agglomeration of PTFE by agitation of a slurry in a mixture of water and an organic liquid (U.S. Pat. No. 3,527,857 and B.P. 1,100,388).

Methods of agglomeration of a filled PTFE powder have been proposed by agitating the filled PTFE in water (U.S. Pat. No. 3,766,133) by wetting the filled PTFE with an organic liquid (B.P. 1,100,388).

The conventional methods of agglomerating PTFE powder have the following disadvantages. For example, in the method of agglomeration by wetting with an organic liquid excess agglomeration cannot be easily prevented thereby obtaining a lesser amount of the desired agglomerated PTFE and the method has been disadvantageous in the preparation of the agglomerated PTFE having narrow particle size distribution and relatively fine particles. When the agglomerated PTFE containing a filler is prepared, it has been required to give a post-treatment such as tumbling process for improving powder flowability so as to obtain suitable product.

In the method of agglomeration by agitation of a slurry in water, large excess power for agitation for long time has been required, and it has been difficult to obtain the agglomerated PTFE having relatively small particle size. It has been usually difficult to obtain the agglomerated PTFE containing a filler by the method of agglomeration by agitation of a slurry in water.

In the method of agglomeration by agitation of a slurry in a mixture of water and an organic liquid described in U.S. Pat. No. 3,527,857 and B.P. 1,100,388, the amount of the mixture of water and an organic liquid to PTFE powder has been too large whereby excess power for agitation has been required and control of particle size distribution has been difficult.

SUMMARY OF THE INVENTION

It is an object of the present invention to provide a method of agglomerating polytetrafluoroethylene powder to obtain an agglomerated polytetrafluoroethylene having a narrow particle size distribution while inhibiting excess agglomeration.

It is another object of the present invention to provide a method of agglomerating polytetrafluoroethylene powder for short time with less power for agitation.

It is yet another object of the present invention to provide a method of agglomerating polytetrafluoroethylene powder to obtain an agglomerated polytetrafluoroethylene having excellent powder flowability and high bulk density.

It is still another object of the present invention to provide a method of agglomerating polytetrafluoroethylene with a filler.

The foregoing and other objects of the present invention have been attained by subjecting finely ground polytetrafluoroethylene molding powder having an average particle size of less than 100$\mu$, to high speed agitation in the presence of a medium consisting essentially of water and a hydrophobic organic liquid having a volumetric ratio of the organic liquid to water of 2 to $\frac{1}{2}$, at a ratio of 0.5 to 1 liter of the medium per 1 Kg of the powder to agglomerate it.

DETAILED DESCRIPTION OF THE PREFERRED EMBODIMENTS

It is important to use a medium consisting essentially of water and a hydrophobic organic liquid which dissolves less than 15 wt.% in water at the temperature of agglomeration.

When only a hydrophobic organic liquid is used, excess agglomeration cannot be easily prevented so that a lesser amount of the desired agglomerated PTFE is obtained. When the specific amount of water is added, excess agglomeration can be effectively prevented to obtain the agglomerated PTFE having narrow particle size distribution in high ratio of the desired agglomerated PTFE.

The method of the present invention is especially effective for preparing the agglomerated PTFE having relatively small particle size such as less than 2000$\mu$ especially 100 to 600$\mu$ of an average particle size.

It is important to maintain the volumetric ratio of the hydrophobic organic liquid to water in the range of 2 to $\frac{1}{2}$. If the amount of water is too small, the ratio of the desired agglomerated PTFE is decreased by the formation of excess agglomeration or the particle size distribution of the agglomerated PTFE is too broad or the powder flowability is inferior. If the amount of water is too large, excess power for agitation is required and the control of the particle size distribution is difficult.

It is also important to add the medium of water and the hydrophobic organic liquid at a ratio of less than the amount of the powdered material, that in a ratio of 0.5 to 1 liter preferably 0.6 to 0.8 liter of the medium per 1 Kg of the powdered material. If the amount of the medium is too small, the agglomeration effect is too small and the powder flowability of the agglomerated product is inferior or the bulk density is not high enough. If the amount of the medium is too large, agglomerated particles having a diameter of more than 2000$\mu$ are formed or the bulk density is decreased.

In accordance with the present invention, the medium having the specific ratio is used under high speed conditions wherein the peripheral speed of the agitating blade is more than 5 m/sec., preferably about 10 to 30 m/sec. If the agitating speed is too slow, excess agglomeration results or the powder flowability of the agglomerated product is disadvantageously inferior. If the agitating speed is too fast, excess power for agitation results or the agglomeration effect is decreased by heat caused by the agitation, disadvantageously.

The agitating methods and means for the high speed agitation are not critical and can be selected from various methods and means, such as speed kneader for specific high speed agitation, Henshel mixer, homomixer, V-blender or W-blender having a forcible blade. It is especially preferable to use Henshel mixer from the viewpoint of the operability and processability.

The ratio of the powder filled in the vessel for agitation is preferably selected from the viewpoint of the practical processing and the effect for agglomeration. For example, in a 30 liter Henshel mixer, the amount of the powder is less than 5 Kg and in a 75 liter Henshel mixer, the amount of the powder is less than 15 Kg. The other conditions for agglomeration are not critical. A sufficient time for agglomeration is about 3 seconds to 3 minutes. The temperature is preferably less than 40° C., preferably about 10° to 30° C.

The finely ground PTFE molding powder is usually prepared by grinding PTFE molding powder in a grinder such as a hammer mill having cutting blades, an air mill, or the like.

In the present invention, it is preferable to use a PTFE molding powder having an average particle diameter of less than 100$\mu$ preferably about 20 to 50$\mu$, and especially a molding powder having a specific surface area of less than 6 m$^2$/g. Suitable PTFE materials include PTFE which is modified with a small amount of hexafluoropropylene, trifluorochloroethylene, perfluorovinyl ether, or the like.

When a filled PTFE is agglomerated by the method of the present invention, suitable fillers include carbon fiber, graphite powder, carbon graphite powder, coke flour, and also modified glass fiber, asbestos fiber, bronze and metal oxides which are modified so that the fiber surfaces are hydrophobic.

The filled PTFE containing less than 70 wt.%, preferably 10 to 50 wt.% of a filler can be agglomerated. A pigment or a stabilizer which has hydrophobic properties can be added. For example, the advantageous effects of the method of the present invention can be attained for agglomeration of the colored PTFE containing 1 to 0.1 wt.% of an inorganic pigment prepared by treating chromium oxide or cadmium oxide with a dispersion of PTFE to yield hydrophobic properties or the colored PTFE containing 0.01 to 2 wt.% of carbon black.

In accordance with the method of the present invention, the agglomeration of PTFE containing hydrophobic glass fiber modified with polyphenylenesulfide can be effectively attained. The filler can be modified to give hydrophobic properties by the methods described in U.S. Ser. No. 693,684 and Japanese Unexamined Patent Publication No. 130450/1976.

The method of the present invention can be advantageously applied for the agglomeration of PTFE powder containing carbon fiber having relatively long length such as 60 to 500$\mu$ especially 100 to 200$\mu$ as the filler.

In accordance with the method of the present invention, the agglomerated product containing the filler which is uniformly distributed can be obtained by preventing the filler separation or excess agglomeration even though the carbon fiber having long length is used as the filler.

The carbon fiber filler is added in an amount of 1 to 40 wt. parts, preferably 5 to 20 wt. parts per 100 wt. parts of PTFE. It is possible to obtain an agglomerated PTFE containing carbon fiber wherein the PTFE has an average diameter of less than 100$\mu$ and the carbon fiber has an average diameter of 5 to 20$\mu$ and an aspect ratio (length/diameter) of 5 to 50. The agglomerated particles have an average diameter of 100 to 2000$\mu$ and an angle of repose of less than 45 degree and a bulk density of more than 0.5 g/ml. The ultimate tensile strength of the sintered product (speed of 200 mm/min.) can be more than 100 Kg/cm$^2$.

The agglomerated PTFE containing carbon fiber obtained by the method of the present invention has an average diameter of 100 to 2000$\mu$, especially 300 to 600$\mu$ and an angle of repose of less than 45 degrees especially less than 40 degrees and a bulk density of more than 0.5 g/ml preferably about 0.55 to 0.65 g/ml. A sintered product having an ultimate tensile strength of more than 100 Kg/cm$^2$ can be obtained by using the agglomerated PTFE containing carbon fiber.

The ultimate tensile strength is defined as follows. About 40 g of the agglomerated product is filled and is compressed under the pressure of 700 Kg/cm$^2$ to form a sheet having a size of 100$^{mm}$ × 100$^{mm}$ and a thickness of about 3 mm.

The sheet is sintered in an electric oven at 370° C. for 3 hours as standard. A test for the tensile strength test (#3 dumbbell) is formed in accordance with Japanese Industrial Standard K 6891. The tensile strength test is carried out by a Tensilon tensile tester at a cross-head speed of 200 mm/min. to record the tensile load and cross-head distance on a recording paper.

After the test, the maximum tensile load is the initial deforming zone (strain of about 50%) is divided by the sectional area of the parallel part of the test piece (shape of dumbbell) to give the tensile strength.

When the agglomerated PTFE containing the specific carbon fiber is used, a sintered product having excellent ultimate tensile strength such as more than 100 Kg/cm$^2$ especially about 150 to 180 Kg/cm$^2$ is obtained. On the other hand, when the pure agglomerated PTFE is used, it is about 85 Kg/cm$^2$. When the agglomerated PTFE containing 15 wt.% of graphite powder is used, it is about 80 Kg/cm$^2$. When the agglomerated PTFE containing 20 wt.% of glass fiber having average length of 100 to 200$\mu$ is used, it is about 70 Kg/cm$^2$.

When the agglomerated PTFE containing the carbon fiber is molded and the molded product is used as a bearing, the PV value can be remarkably high such as more than 10 Kg/cm$^2$.m/s, and sometimes about 30 Kg/cm$^2$.m/s. On the contrary, when the pure agglomerated PTFE is used, it is less than 1 Kg/cm$^2$.m/s. When the agglomerated PTFE containing 20 wt.% of glass fiber, it is less than 10 Kg/cm$^2$.m/s. When the agglomerated PTFE containing 15 wt.% of graphite powder, it is less than 5 Kg/cm$^2$.m/s.

The hydrophobic organic liquids used in the method of the present invention include various types which wet PTFE. It is preferable that the liquid have a surface tension of less than 45 dyne/cm, especially less than 35 dyne/cm at 23° C. to wet PTFE.

The boiling point of the organic liquid is selected from the viewpoint of the processability of the liquid-solid mixture during agglomeration and the ease of removal of the liquid when the agglomerated PTFE is dried. Preferably an organic liquid is used which has a boiling point of about 40° to 200° C., especially about 60° to 150° C.

The hydrophobic organic liquid is sparingly soluble in water or is water insoluble so that less than 15 wt.% of the organic liquid is miscible with water at the temperature of agglomeration.

Suitable hydrophobic organic liquids include aliphatic hydrocarbons, alicyclic hydrocarbons and aromatic hydrocarbons such as benzene, cyclohexane, toluene, xylene; esters such as butyl acetate, amyl acetate; higher alcohols such as butanol, hexanol; ethers; halohydrocarbons such as carbon tetrachloride, perchloroethylene, chloroform, trichloroethylene, chlorobenzene, trifluorotrichloroethane; aniline, etc. Preferably an aliphatic hydrocarbon or halohydrocarbon such as perchloroethylene is employed.

An agglomerated product of the present invention having a narrow particle size distribution can be easily obtained by agglomeration using speed agitation conditions. During drying of the agglomerated product the medium of water and the hydrophobic organic liquid are usually readily separated by from the product. Drying of the product can be attained by heating the PTFE during agglomeration under high speed agitation conditions. Normally however, in the present process, high speed agitation is conducted for a short time so that preferably the medium of water and the hydrophobic organic liquid is separated from the product after the agglomeration. Drying can be achieved by vacuum drying. Preferably, the mixture to be dried is tumbled during drying. The temperature and the time for removing essentially all of the water and the hydrophobic organic liquid usually range from about 150° to 300° C. for about 4 to 6 hours. Thus, the agglomerated PTFE having an average diameter of 100 to 2000μ especially 300 to 600μ can be advantageously obtained. The powder flowability is excellent so that it has an angle of repose of less than 45 degrees especially less than 40 degrees. The amount of large particles having a diameter of more than 2000μ is controlled to less than 10 wt.% preferably less than 5 wt.%. In the particle size distribution, the ratio of the particles having diameters of 100 to 400μ is more than 90% in the average diameter of 300μ (weight cumulative distribution of 50%) and the ratio of the particles having diameters of 400 to 800μ is more than 80% in the average diameter of 600μ. The bulk density is usually more than 0.6 g/ml, preferably about 0.7 to 0.9 g/ml in the case of pure PTFE. The bulk density of the filled PTFE or the other type PTFE are dependent upon the kind and amount of the filler. For example, the bulk density is preferably 0.6 g/ml in the case of an agglomerated PTFE containing 10 wt.% carbon fiber. The bulk density is preferably 0.7 g/ml in the case of agglomerated PTFE containing 20 wt.% glass fiber modified with a resin.

Non-dried agglomerated PTFE can be sieved by a vibrating sieve to separate large particles having a diameter of more than 2000μ. Sieving can be substantially improved by the addition of water to the hydrophobic organic liquid. If the PTFE undergoing agglomeration is simultaneously vibrated and tumbled on the sieve or on the plate below the sieve the effect of agglomeration is substantially improved. The bulk density of agglomerated PTFE particles can be improved after sieving by use of a plate type granulator or a V type granulator which slowly tumble the particles. On the other hand, it is possible to obtain agglomerated particles which have a small diameter such as less than 150μ by pulverizing the primary agglomerated particles by passing the particles through a screen during high speed agitation in a hammer mill and then subjecting the screened particles to high speed agitation in the presence of water.

The following examples are given solely to illustrate the present invention in detail.

EXAMPLE 1

In a 30 liters Henshel mixer, 3 Kg of finely ground polytetrafluoroethylene molding powder (PTFE)(an average diameter of 25μ) was admixed with 1 liter of perchloroethylene and 2 liters of water by subjecting to high speed agitation. The blades for agitation were a combination of straight blades and S shape blades. The agitation was conducted at 23° C. at a peripheral speed of 20 m/sec. for 30 seconds. After the agglomeration, water was removed on a screen (200 mesh) and the agglomerates were dried in an oven at 200° C. for 4 hours to completely remove water and perchloroethylene. The resulting agglomerated product has a bulk density of 0.75 g/cm$^3$, an average diameter of 300μ and an angle of repose of 35 degree.

EXAMPLE 2

Chromium oxide was treated with an emulsion of PTFE (average diameter of 0.2μ) and was sintered whereby chromium oxide coated with 10% of PTFE was obtained.

In the Henshel mixer, 3 Kg of polytetrafluoroethylene molding powder of Example 1 was admixed with 30 g of the chromium oxide coated and sintered with 10% of PTFE at a peripheral speed of 60 m/sec. for 3 minutes.

After mixing them, 1.2 liters of Isopar G and 1.8 liters of water were simultaneously added to the mixture and the mixture was agitated at a peripheral speed of 15 m/sec. for 1 minute.

After the agglomeration, water was removed on a screen (200 mesh) and the agglomerates were sieved with an upper screen (10 mesh) and a lower screen (200 mesh) by Sato type vibration sieving machine to remove large particles on the 10 mesh screen and water.

The bulk densities before sieving step and after sieving step were respectively 0.72 and 0.78 g/cm$^3$ in the measurement after drying them.

The amount of large particles on the 10 mesh screen was 5 wt.%.

After the vibration sieving step, the agglomerates were dried in vacuum to remove more than 99% of Isopar G and the agglomerates were further dried in an electric oven at 300° C. for 4 hours. The resulting agglomerated product had a bulk density of 0.80 g/cm$^3$, an angle of repose of 32 degree and an average diameter of 600μ.

EXAMPLE 3

In a 75 liters Henshel mixer, 10 Kg of polytetrafluoroethylene molding powder of Example 1 was uniformly admixed with 2.5 Kg of glass fiber (diameter of 10μ and length of 40μ) coated and sintered with 2% of polyalkylenesulfide resin.

Then, 4.5 liters of perchloroethylene and 9 liters of water were added to the mixture. The agitation was conducted at a peripheral speed of 10 m/sec. for 30 seconds and then at a peripheral speed of 4 m/sec. for 3 minutes.

The bulk densities of the agglomerates after the agitation at 10 m/sec. for 30 sec. and at 4 m/sec. for 3 min. were respectively 0.68 g/cm$^3$ and 0.72 g/cm$^3$.

The agglomerates were separated from water and were dried in the electric oven in accordance with the process of Example 1.

After drying it, large particles were separated by a 20 mesh screen. The resulting agglomerated product had a bulk density of 0.73 g/cm$^3$, an angle of repose of 36 degree and an average diameter of 400μ. The ratio of the particles passed through the 20 mesh sieve was 90%.

EXAMPLE 4

In a 75 liters Henshel mixer, 10 Kg of polytetrafluoroethylene molding powder of Example 1 was uniformly admixed with 10 g of carbon black at a peripheral speed of 60 m/sec. for 3 minutes.

In the Henshel mixer, 3.3 liters of Isopar G and 6.6 liters of water were simultaneously added to the mixture and the mixture was agitated at a peripheral speed of 30 m/sec. for 1 minute.

After the agglomeration, water was removed. A part of the agglomerates were pulverized by a hammer mill equipped with 3 mm screen at a peripheral speed of 30 m/sec. The particles passed through the screen was agitated with 6 liters of water in the Henshel mixer at a peripheral speed of 10 m/sec. for 3 minutes.

In accordance with the process of Example 2, the resulting agglomerates were dried.

The agglomerates before passing the hammer mill had an average diamter of 300μ while the agglomerates after passing the hammer mill had an average diameter of 150μ.

EXAMPLE 5

In a 30 liters Henshel mixer, 3 Kg of polytetrafluoroethylene molding powder and 1 Kg of carbon fiber (diameter of 13μ and length of 15μ) were uniformly mixed and 1.8 liters of benzene and 1 liter of water were added and the mixture was agitated at a peripheral speed of 10 m/sec. for 60 seconds.

In accordance with the process of Example 2, the agglomerates were dried and large particles were separated by a 10 mesh screen.

The agglomerated product had a bulk density of 0.58 g/cm$^3$, an angle of repose of 38 degree and an average diameter of 800μ.

Reference Example 1

In accordance with the process of Example 1 except adding 1.2 liters of perchloroethylene and 0.2 liter of water, the agglomerated product was prepared. As the result, the amount of large particles was about 40% and an angle of repose of the agglomerated product was 40 degree.

Reference Example 2

In accordance with the process of Example 1 except adding 2.2 liters of perchloroethylene and 0.9 liter of water, the agglomerated product was prepared. As the result, the average diameter of the agglomerated product was more than 1000μ and the amount of large particles was about 30%.

Reference Example 3

In accordance with the process of Example 5 except adding 0.8 liter of benzene and 2 liters of water, the agglomerated product was prepared. The agglomerated product had a bulk density of 0.50 g/cm$^3$ and an angle of repose of 40 degree.

EXAMPLE 6

In a 30 liters Henshel mixer, 900 g of polytetrafluoroethylene molding powder was uniformly admixed with 100 g of carbon fiber (length of 100μ) and 450 ml of Isopar G and 400 ml of water were added and the agitation was conducted at a peripheral speed of 10 m/sec. for 30 seconds.

After the agglomeration, the agglomerates wetted with Isopar G and water were treated by a Sato type vibration sieving machine to remove large particles having more than 2000μ and to remove water on a 200 mesh screen.

The agglomerates were dried in a vacuum to remove 99% of Isopar G and were dried at 300° C. in an electric oven.

The resulting agglomerated product had a bulk density of 0.62 g/cm$^3$, an angle of repose of 36 degree and an average diameter of 600μ (cumulative distribution of 50%).

The test piece of #3 dumbbell prepared from the sheet (100$^{mm}$ × 100$^{mm}$ × 2$^{mm}$) obtained by compressing the agglomerated product under the pressure of 700 Kg/cm$^2$ and sintered at 370° C. for 2 hours had an ultimate tensile strength of 200 Kg/cm$^2$ and an elongation of 250%. The amount of large particles having diameters of more than 2000μ was 10%.

EXAMPLE 7

In accordance with the process of Example 6 except adding 480 ml of perchloroethylene and 250 ml of water to a mixture of 850 g of polytetrafluoroethylene molding powder and 150 g of carbon fiber (length of 200μ), the agglomerated product was prepared.

As the result, the agglomerated product had a bulk density of 0.56 g/cm$^3$, an angle of repose of 38 degree and an average diameter of 800μ.

The amount of large particles having diameters of more than 2000μ was 20%. The molded product had an ultimate tensile strength of 150 Kg/cm$^2$ and an elongation of 30%.

EXAMPLE 8

In accordance with the process of Example 6 except adding 350 ml of perchloroethylene and 700 ml of water to a mixture of 800 g of polytetrafluoroethylene molding powder and 200 g of carbon fiber (length of 60μ) pulverized by a ball mill, the agglomerated product was prepared.

As the result, the agglomerated product had a bulk density of 0.55 g/cm$^3$, an angle of repose of 36 degree and an average diameter of 300μ.

The amount of large particles having diameters of more than 2000μ was less than 1%. The molded product had an ultimate tensile strength of 180 Kg/cm$^3$ and an elongation of 50%.

EXAMPLE 9

In accordance with the process of Example 6 except adding 500 ml of Isopar H, and 300 ml of water to a mixture of 950 g of polytetrafluoroethylene and 50 g of carbon fiber (length of 500μ), the agglomerated product was prepared.

As the result, the agglomerated product had a bulk density of 0.60 g/cm$^3$, an angle of repose of 38 degree and an average diameter of 1000μ.

Reference Example 4

In accordance with the process of Example 6 except using 100 ml of water, the agglomerated product was prepared. The amount of large particles having diameters of more than 2000μ was 40%.

Reference Example 5

In accordance with the process of Example 6 except using 1300 ml of water, the agglomerated product was prepared and the molded product was prepared by using the agglomerated product.

The molded product had an ultimate tensile strength of 150 Kg/cm$^2$ and an elongation of 30%.
During the agglomeration, relatively large amount of the carbon fiber was separated.

Reference Example 6

In accordance with the process of Example 6 except using no water, the agglomerated product was prepared. The amount of large particles was about 50%. The large particles separated by the screen.
The agglomerates were further treated by a plate type agglomerating machine to improve powder flowability. However, the resulting agglomerated product contained many carbon fiber mass.

Reference Example 7

In accordance with the process of Example 6 except using carbon fiber (length of 1 mm) instead of the carbon fiber (length of 100μ), the agglomerated product was prepared. The agglomerated product was bulky and had inferior powder flowability.

EXAMPLES 10 to 18

Polytetrafluoroethylene molding powder (average diameter of 40μ) was admixed with carbon fiber (diameter of 10μ). The average length and the amount of the carbon fiber are shown in Table 1.

Table 1

| Powder No. | Length of carbon fiber (μ) | Aspect ratio | Amount of carbon fiber (wt. %) |
|---|---|---|---|
| A | 50 | 5 | 10 |
| B | 80 | 8 | 10 |
| C | 120 | 12 | 10 |
| D | 200 | 20 | 10 |
| E | 500 | 50 | 10 |

These powders were mixed at a peripheral speed of 30 m/sec. for 1.5 minutes in a Henshel mixer.

The agglomerations of the powdery mixtures were conducted under the conditions shown in Table 2 by adding the medium of the organic liquid and water to the powdery mixture and agitating the mixture.

In each case, 1 Kg of the powdery mixture was agglomerated and the agglomerates were dried at 300° C. for 1 hour in an oven.

The 30 liters Henshel mixer having blades related at a peripheral speed of 10 m/sec. was used.

The characteristics of the agglomerated products of polytetrafluoroethylene containing carbon fiber and the molded products prepared by using the agglomerated products, were shown in Table 3. In Examples 15, 16 and 17, the fillers F, G and H shown in Table 3 were used.

Table 2

| Powder No. | Type of filler | Size of filler | | Amount of filler |
|---|---|---|---|---|
| F | graphite powder | 60μ | | 15% |
| G | glass fiber | diameter | 10μ | 20% |
|   |             | length   | 100μ |     |
| H | glass fiber | diameter | 10μ | 20% |
|   |             | length   | 200μ |     |

Table 3

| | Powder No. | Condition for agglomeration | | Characteristics of agglomerated product | | | Ultimate tensile strength (Kg/cm$^2$) |
|---|---|---|---|---|---|---|---|
| | | O.G.≠ water | Medium powder mixture (liter/Kg) | Bulk density | Diameter (μ) | Angle of repose (degree) | |
| Exp. 10 | A | 1/1 | 0.75 | 0.60 | 400 | 38 | 100 |
| 11 | B | 1/1 | 0.80 | 0.58 | 500 | 36 | 140 |
| 12 | C | 1/1 | 0.82 | 0.56 | 600 | 38 | 160 |
| 13 | D | 1/1 | 0.86 | 0.55 | 800 | 38 | 170 |
| 14 | E | 1/1 | 0.90 | 0.50 | 1000 | 38 | 150 |
| 15 | F | 1/1 | 0.80 | 0.60 | 600 | 36 | 80 |
| 16 | G | 1/0 | 0.40 | 0.70 | 600 | 36 | 60 |
| 17 | H | 1/0 | 0.50 | 0.60 | 2000 | 40 | 70 |
| 18 | C | 1/3 | 1.50 | 0.48 | 1000 | 38 | 90 |

≠: O.G.: aliphatic hydrocarbon having a boiling point higher than 150° C. (Isopar)

EXAMPLES 19 to 24

The agglomerated products were prepared by using powdery mixtures of polytetrafluoroethylene with carbon fiber (length of 120μ) at a ratio of 5 wt.% (Exp. 19), 15 wt.% (Exp. 20) and 20 wt.% (Exp. 21), 1 wt.% (Exp. 23) and 40 wt.% (Exp. 24) and non-filler (Exp. 22).

The characteristics of the agglomerated products and the molded products prepared by using the agglomerated products, were shown in Table 4.

Table 4

| | Condition for agglomeration | | Characteristics of agglomerated product | | | Ultimate tensile strength (Kg/cm²) |
|---|---|---|---|---|---|---|
| | O.G. ≠ water | Medium powder mixture (liter/Kg) | Bulk density | Diameter (μ) | Angle of repose (degree) | |
| Exp. 19 | 1/1 | 0.80 | 0.65 | 600 | 36 | 100 |
| 20 | 1/0.8 | 0.80 | 0.55 | 600 | 38 | 170 |
| 21 | 1/0.6 | 0.80 | 0.50 | 600 | 38 | 170 |
| 22 | 1/1 | 0.80 | 0.70 | 600 | 36 | 80 |
| 23 | 1/1 | 0.80 | 0.65 | 600 | 36 | 85 |
| 24 | 1/1 | 0.80 | 0.45 | 600 | 40 | 80 |

≠ O.g.: an aliphatic hydrocarbon having a boiling point greater than 150° C (Isopar)

What is claimed is:

1. A method of agglomerating polytetrafluoroethylene molding powder, which comprises:
    (a) agglomerating a finely ground polytetrafluoroethylene molding powder by subjecting said powder having an average particle diameter of less than 100 μm to high speed agitation in the presence of a medium consisting of water and a hydrophobic organic liquid, of which less than 15 wt.% is miscible with water at the temperature of agglomeration, at a volumetric ratio of the organic liquid to water of 2:1 to 1:2 and a ratio of 0.5 to 1 liter of the medium per 1 Kg of said powder; and
    (b) separating the resulting agglomerates from the medium.

2. The method of claim 1, wherein the high speed agitation is conducted with an apparatus in which the peripheral speed of the agitating blades is greater than 5 m/sec.

3. The method of claim 1, wherein the particles of the finely ground polytetrafluoroethylene molding powder have an average diameter of 20 to 50 μm.

4. The method of claim 1, wherein the temperature of agglomeration is less than 40° C.

5. The method of claim 1, wherein the hydrophobic organic liquid has a surface tension less than 45 dyne/cm at 23° C.

6. The method of claim 1, wherein the hydrophobic organic liquid has a boiling point of 40° to 200° C.

7. The method of claim 1, wherein the resulting agglomerates have an average diameter of 300 to 600 μm and an angle of repose of less than 45 degrees.

8. The method of claim 1, wherein the resulting agglomerates contain less than 10 wt.% of particles having diameters greater than 2,000 μm.

9. A process for preparing an agglomerated polytetrafluoroethylene material containing a solid hydrophobic filler, which comprises:
    (a) agglomerating a mixture of polytetrafluoroethylene having an average particle diameter of less than 100 μm and the hydrophobic filler under high speed agitation conditions in the presence of a medium consisting of water and a hydrophobic organic liquid, which is soluble in water in an amount of less than 15 wt.% at the temperature of agglomeration, having a volumetric ratio of the organic liquid to water of 2:1 to 1:2 and a ratio of 0.5 to 1 liter of the medium per 1 Kg of the mixture of the resin and the filler; and
    (b) separating the resulting agglomerates from the medium.

10. The process of claim 9, wherein the hydrophobic filler is carbon fiber.

11. The process of claim 9, wherein the hydrophobic filler is formed by a process in which the surface of a non-hydrophobic filler is modified by a treatment which imparts hydrophobic properties to said surface.

12. The process of claim 9, wherein the hydrophobic filler is glass fiber whose surface is treated with a polyphenylene sulfide, thereby forming a hydrophobic surface on said glass fiber.

13. The process of claim 9, wherein the hydrophobic filler is carbon black.

14. The process of claim 9, wherein the hydrophobic filler is chromium oxide whose surface is treated with polytetrafluoroethylene thereby forming a hydrophobic surface on said chromium oxide.

15. The process of claim 9, wherein the hydrophobic filler is carbon fiber having an average length of 100 to 200 μm.

16. The process of claim 9, wherein the content of the filler in the mixture is 10 to 50 wt.%.

* * * * *